(12) United States Patent
Lee (10) Patent No.: US 10,261,613 B2
(45) Date of Patent: Apr. 16, 2019

(54) TOUCH PANEL HAVING CONNECTION LINES AND DISPLAY DEVICE HAVING CONNECTION LINES

(71) Applicant: Samsung Display Co., Ltd., Yongin-si (KR)

(72) Inventor: Eung Kwan Lee, Cheonan-si (KR)

(73) Assignee: Samsung Display Co., Ltd., Yongin-si (KR)

( * ) Notice: Subject to any disclaimer, the term of this patent is extended or adjusted under 35 U.S.C. 154(b) by 147 days.

(21) Appl. No.: 14/885,437

(22) Filed: Oct. 16, 2015

(65) Prior Publication Data

US 2016/0306473 A1  Oct. 20, 2016

(30) Foreign Application Priority Data

Apr. 14, 2015 (KR) .................. 10-2015-0052485

(51) Int. Cl.
*G06F 3/041* (2006.01)
*G06F 3/044* (2006.01)

(52) U.S. Cl.
CPC ............ *G06F 3/0412* (2013.01); *G06F 3/044* (2013.01); *G06F 2203/04102* (2013.01)

(58) Field of Classification Search
CPC ......... G06F 2203/04102; G06F 3/0412; G06F 3/044
See application file for complete search history.

(56) References Cited

U.S. PATENT DOCUMENTS

| 2011/0210934 | A1* | 9/2011 | Lee | G06F 3/044 345/173 |
| 2013/0050107 | A1* | 2/2013 | Xie | G06F 3/044 345/173 |
| 2013/0106747 | A1* | 5/2013 | Choi | G06F 3/041 345/173 |
| 2014/0110236 | A1* | 4/2014 | Lee | H01H 13/704 200/5 A |
| 2014/0218343 | A1 | 8/2014 | Hicks et al. | |
| 2015/0234520 | A1* | 8/2015 | Chen | G06F 3/044 345/173 |
| 2015/0253897 | A1* | 9/2015 | Liang | G06F 1/16 345/174 |
| 2015/0370367 | A1* | 12/2015 | Wang | G06F 3/044 345/174 |

FOREIGN PATENT DOCUMENTS

| KR | 1020130035696 | 4/2013 |
| KR | 1020130133381 | 5/2014 |
| KR | 1020140053762 | 5/2014 |

* cited by examiner

*Primary Examiner* — Chun-Nan Lin
(74) *Attorney, Agent, or Firm* — H.C. Park & Associates, PLC (57) ABSTRACT

An exemplary embodiments provides a touch panel including: a substrate including a touch area and a non-touch area, the non-touch area disposed adjacent to the touch area; a touch pad disposed in the touch area; a connection pad disposed in the non-touch area; and a connection line including: a first sub line disposed in the touch area, the first sub line connected to the touch pad; and a second sub line which is disposed in the non-touch area, the second sub line connecting the connection pad and the first sub line.

23 Claims, 5 Drawing Sheets

TOUCH PANEL HAVING CONNECTION LINES AND DISPLAY DEVICE HAVING CONNECTION LINES

CROSS-REFERENCE TO RELATED APPLICATION

This application claims priority from and the benefit of Korean Patent Application No. 10-2015-0052485, filed on Apr. 14, 2015, which is hereby incorporated by reference for all purposes as if fully set forth herein.

BACKGROUND

Field

Exemplary embodiments relate to a touch panel and a display device, and more particularly, to a touch panel including a plurality of touch pads disposed on the same layer and a display device.

Discussion of the Background

A touch panel is an apparatus which detects a touch by a pen or a user's finger. The touch panel has been included on a display panel such as an organic light emitting diode display and a liquid crystal display to receive input signal to a display device.

The touch panel includes a substrate and a plurality of touch pads which are disposed on the substrate to detect a touch. The touch panel may include a plurality of touch pads formed on the same layer.

The above information disclosed in this Background section is only for enhancement of understanding of the background of the inventive concept, and, therefore, it may contain information that does not form the prior art that is already known in this country to a person of ordinary skill in the art.

SUMMARY

Exemplary embodiments provide a touch panel and a display device having advantages of suppressing a signal delay even though a plurality of touch pads are formed on the same layer.

Additional aspects will be set forth in the detailed description which follows, and, in, will be apparent from the disclosure, or may be learned by practice of the inventive concept.

An exemplary embodiment discloses a touch panel including: a substrate including a touch area and a non-touch area, the non-touch area disposed adjacent to the touch area; a touch pad disposed in the touch area; a connection pad disposed in the non-touch area; and a connection line including: a first sub line disposed in the touch area, the first sub line connected to the touch pad; and a second sub line which is disposed in the non-touch area, the second sub line connecting the connection pad and the first sub line.

An exemplary embodiments also discloses a display device including: a display panel including: a display area displaying an image; and a non-display area adjacent to the display area; a touch pad disposed in the display area; a connection pad disposed in the non-display area; and a connection line including: a first sub line disposed in the display area, the first sub line connected to the touch pad; and a second sub line disposed in the non-display area, the second sub line connecting the connection pad and the first sub line.

The foregoing general description and the following detailed description are exemplary and explanatory and are intended to provide further explanation of the claimed subject matter.

BRIEF DESCRIPTION OF THE DRAWINGS

The accompanying drawings, which are included to provide a further understanding of the inventive concept, and are incorporated in and constitute a part of this specification, illustrate exemplary embodiments of the inventive concept, and, together with the description, serve to explain principles of the inventive concept.

DETAILED DESCRIPTION OF THE ILLUSTRATED EMBODIMENTS

In the following description, for the purposes of explanation, numerous specific details are set forth in order to provide a thorough understanding of various exemplary embodiments. It is apparent, however, that various exemplary embodiments may be practiced without these specific details or with one or more equivalent arrangements. In other instances, well-known structures and devices are shown in block diagram form in order to avoid unnecessarily obscuring various exemplary embodiments.

In the accompanying figures, the size and relative sizes of layers, films, panels, regions, etc., may be exaggerated for clarity and descriptive purposes. Also, like reference numerals denote like elements.

When an element or layer is referred to as being "on," "connected to," or "coupled to" another element or layer, it may be directly on, connected to, or coupled to the other element or layer or intervening elements or layers may be present. When, however, an element or layer is referred to as being "directly on," "directly connected to," or "directly coupled to" another element or layer, there are no intervening elements or layers present. For the purposes of this disclosure, "at least one of X, Y, and Z" and "at least one selected from the group consisting of X, Y, and Z" may be construed as X only, Y only, Z only, or any combination of two or more of X, Y, and Z, such as, for instance, XYZ, XYY, YZ, and ZZ. Like numbers refer to like elements throughout. As used herein, the term "and/or" includes any and all combinations of one or more of the associated listed items.

Although the terms "first," "second," etc. may be used herein to describe various elements, components, regions, layers, and/or sections, these elements, components, regions, layers, and/or sections should not be limited by these terms. These terms are used to distinguish one element, component, region, layer, and/or section from another element, component, region, layer, and/or section. Thus, a first element, component, region, layer, and/or section discussed below could be termed a second element, component, region, layer, and/or section without departing from the teachings of the present disclosure.

Spatially relative terms, such as "beneath," "below," "lower," "above," "upper," and the like, may be used herein for descriptive purposes, and, thereby, to describe one element or feature's relationship to another element(s) or feature(s) as illustrated in the drawings. Spatially relative terms are intended to encompass different orientations of an apparatus in use, operation, and/or manufacture in addition to the orientation depicted in the drawings. For example, if the apparatus in the drawings is turned over, elements described as "below" or "beneath" other elements or features would then be oriented "above" the other elements or features. Thus, the exemplary term "below" can encompass both an orientation of above and below. Furthermore, the apparatus may be otherwise oriented (e.g., rotated 90 degrees or at other orientations), and, as such, the spatially relative descriptors used herein interpreted accordingly.

The terminology used herein is for the purpose of describing particular embodiments and is not intended to be limiting. As used herein, the singular forms, "a," "an," and "the" are intended to include the plural forms as well, unless the context clearly indicates otherwise. Moreover, the terms "comprises," "comprising," "includes," and/or "including," when used in this specification, specify the presence of stated features, integers, steps, operations, elements, components, and/or groups thereof, but do not preclude the presence or addition of one or more other features, integers, steps, operations, elements, components, and/or groups thereof.

Various exemplary embodiments are described herein with reference to sectional illustrations that are schematic illustrations of idealized exemplary embodiments and/or intermediate structures. As such, variations from the shapes of the illustrations as a result, for example, of manufacturing techniques and/or tolerances, are to be expected. Thus, exemplary embodiments disclosed herein should not be construed as limited to the particular illustrated shapes of regions, but are to include deviations in shapes that result from, for instance, manufacturing. For example, an implanted region illustrated as a rectangle will, typically, have rounded or curved features and/or a gradient of implant concentration at its edges rather than a binary change from implanted to non-implanted region. Likewise, a buried region formed by implantation may result in some implantation in the region between the buried region and the surface through which the implantation takes place. Thus, the regions illustrated in the drawings are schematic in nature and their shapes are not intended to illustrate the actual shape of a region of a device and are not intended to be limiting.

Unless otherwise defined, all terms (including technical and scientific terms) used herein have the same meaning as commonly understood by one of ordinary skill in the art to which this disclosure is a part. Terms, such as those defined in commonly used dictionaries, should be interpreted as having a meaning that is consistent with their meaning in the context of the relevant art and will not be interpreted in an idealized or overly formal sense, unless expressly so defined herein.

Hereinafter, a touch panel according to an exemplary embodiment will be described with reference to FIGS. 1 and 2.

Figure 1:
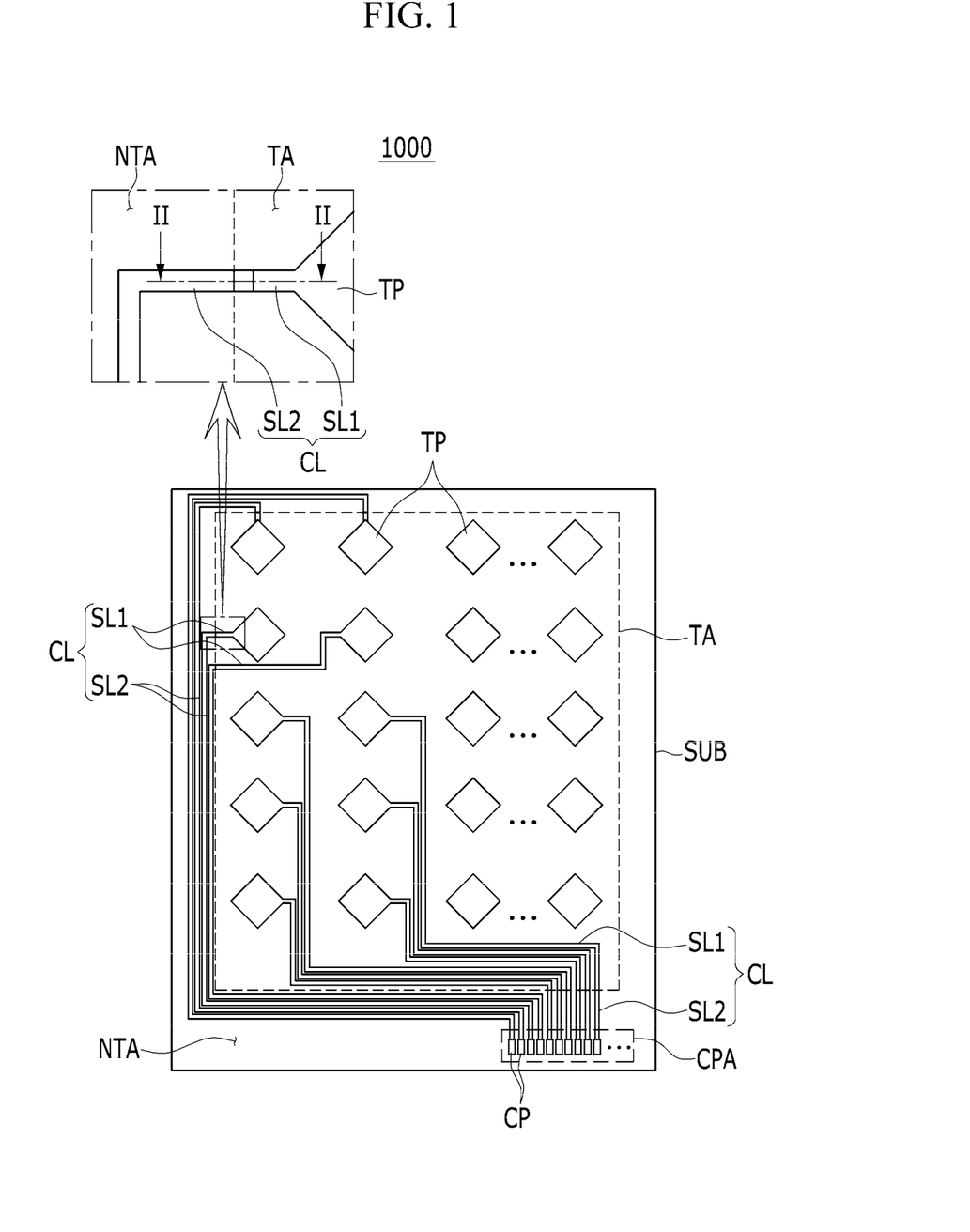
FIG. 1 is a plan view illustrating a touch panel according to an exemplary embodiment.

FIG. 1 is a plan view illustrating a touch panel according to an exemplary embodiment. Referring to FIG. 1, a touch panel 1000 configured to recognize a touch according to an exemplary embodiment may include a substrate SUB, a touch pad TP, a connection pad CP, and a connection line CL. The touch panel 1000 may include a touch controller (not illustrated), which may be in a form of a flexible printed circuit board (FPCB), a printed circuit board (PCB), and the like, and may be connected to the connection pad CP. The touch controller digitizes an electrical analog signal transmitted from the touch panel 1000 into a digital signal using a converter and the like, to detect location information of a user's touch.

The substrate SUB may be flexible and may be a substrate including an organic material, an inorganic material, glass, or metals like stainless steel. The substrate SUB may be flexible, but the exemplary embodiments are not limited thereto, and the substrate SUB maybe stretchable, foldable, bendable, or rollable. The substrate SUB may be flexible, strechable, foldable, bendable, or rollable, and therefore, the entire touch panel 1000 may be flexible, stretchable, foldable, bendable, or rollable.

The substrate SUB includes a touch area TA recognizing a touch, a non-touch area NTA disposed adjacent to the touch area TA, and a pad area CPA disposed in the non-touch area NTA.

The touch area TA of the substrate SUB is disposed at a central portion of the whole plate surface of the substrate SUB, but the exemplary embodiments are not limited thereto, and therefore, the touch area TA may be disposed at a peripheral portion of the whole plate surface of the substrate SUB.

The non-touch area NTA is disposed surrounding the touch area TA, but the exemplary embodiments are not limited thereto, and the non-touch area NTA may be disposed adjacent to the touch area TA.

The pad area CPA is disposed at a portion of the non-touch area NTA, but the exemplary embodiments are not limited thereto, and therefore, the pad area CPA may be disposed at the whole portion of the non-touch area NTA.

The touch area TA may include at least two touch pads TPs, each of the touch pads TPs are disposed spaced apart from each other in the touch area TA of the substrate SUB. The touch pads TPs are disposed in a regular matrix form in the touch area TA of the substrate SUB, but the exemplary embodiments are not limited thereto, and therefore, the touch pads TPs may be disposed in an irregular matrix form in the touch area TA of the substrate SUB. The touch pads TPs are disposed on the same layer on the substrate SUB, and may be formed from a single plate using a photolithography process such as an MEMS process.

The touch pad TP has a two dimensional rhombus shape, but the exemplary embodiments are not limited thereto, and therefore, the touch pad TP may have a triangle, a quadrangle, a pentagon, a hexagon, a heptagon, an octagon, a circle, and an oval shapes.

The touch pad TP may include transparent conductive materials such as silver nano wire (AgNW), indium tin oxide (ITO), and indium zinc oxide (IZO).

The connection pad CP may include at least two of connection pads CPs, each of the connection pads CPs disposed in the non-touch area NTA of the substrate SUB. In detail, each of the connection pads CPs may be disposed in the pad area CPA disposed within the non-touch area NTA adjacent to the touch area TA of the substrate SUB, and each of the connection pads CPs may be disposed spaced apart from each other within the pad area CPA. The connection pad CP may be connected with the touch controller (not illustrated) formed in a form of a flexible printed circuit board (FPCB), a printed circuit board (PCB), or the like.

The connection line CL may include at least two connection lines CLs, each of the connection lines CLs connect between one of the touch pads TPs and one of the connection pads CPs, respectively. The connection line CL includes a first sub line SL1 and a second sub line SL2.

Figure 2:
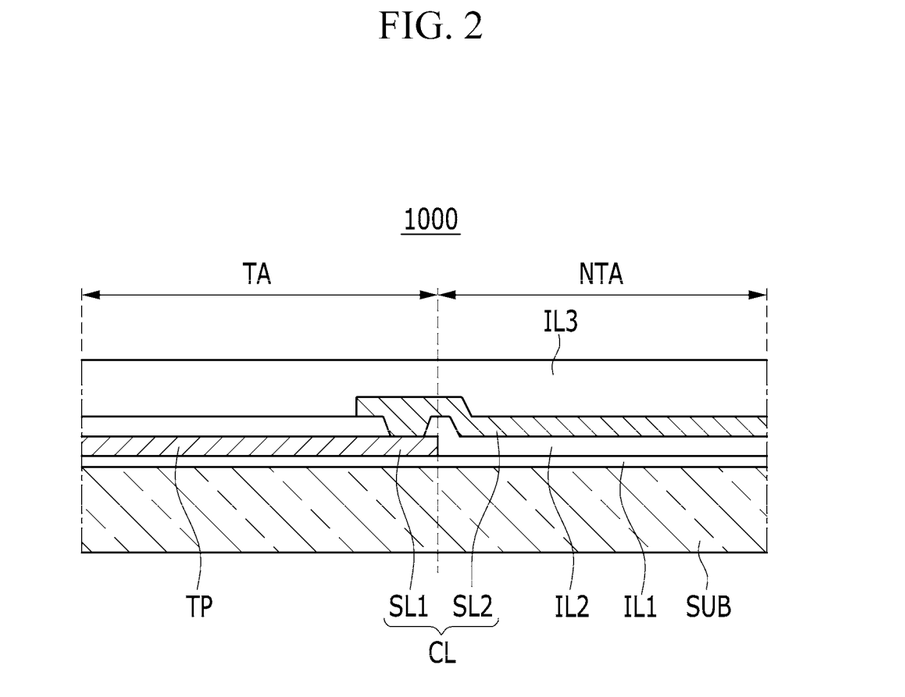
FIG. 2 is a cross-sectional view taken along the section line II-II of FIG. 1.

FIG. 2 is a cross-sectional view taken along the section line II-II of FIG. 1.

Referring to FIGS. 1 and 2, the first sub line SL1 of the connection line CL is disposed in the touch area TA of the substrate SUB and is directly connected to the touch pad TP. The first sub line SL1 includes the same material as the touch pad TP, and is integrally formed with the touch pad TP. The first sub line SL1 may include transparent conductive materials such as silver nano wire (AgNW), indium tin oxide (ITO), and indium zinc oxide (IZO).

The second sub line SL2 of the connection line CL is disposed in the non-touch area NTA of the substrate SUB, and connects the connection pad CP and the first sub line SL1. The second sub line SL2 includes the same material as the connection pad CP, and may be integrally formed with the connection pad CP. However, the exemplary embodiments are not limited thereto, and therefore, the second sub line SL2 may include a material different from the connection pad CP. The second sub line SL2 includes a material different from the touch pad TP and the first sub line SL1, respectively. The second sub line SL2 may include metal such as copper (Cu), molybdenum (Mo), silver (Ag), gold (Au), and aluminum (Al). The second sub line SL2 may include an opaque conductive material. The first sub line SL1 is disposed in the touch area TA and thus includes the transparent conductive material, while the second sub line SL2 is disposed in the non-touch area NTA and thus may include the opaque conductive material. That is, the second sub line SL2 includes a material having low electrical resistance regardless of a transparency of the respective material. Therefore, the second sub line SL2 may have electrical resistance lower than that of the first sub line SL1.

The second sub line SL2 may be disposed on a different layer from the touch pad TP and the first sub line SL1, on the substrate SUB, and therefore, the second sub line SL2 may be disposed on the first sub line SL1 at a portion where the second sub line SL2 and the first sub line SL1 are connected to each other. Referring to FIG. 2, a first insulating layer IL1 is disposed between the first sub line SL1 and the substrate SUB, a second insulating layer IL2 is disposed between the first sub line SL1 and the second sub line SL2, and a third insulating layer IL3 is disposed on the second sub line SL2, but the exemplary embodiments are not limited thereto. A second insulating layer IL2 is disposed between the first sub line SL1 and the second sub line SL2, and thus, the second sub line SL2 is connected to the first sub line SL1 through a contact hole formed in the second insulating layer IL2.

The second sub line SL2 of the connection line CL connected to one touch pad TP disposed adjacent to the pad area CPA may have shorter length than that of the second sub lines SL2s of the connection lines CLs connected to other touch pads TPs disposed farther away from the pad area CPA than the one touch pads TPs. Furthermore, the second sub line SL2 of the connection line CL connected to the one touch pad TP extends straight, and the second sub lines SL2s of the connection lines CLs connected to other touch pads TPs extend bent at least once.

In the touch panel 1000 according to the exemplary embodiment, the touch pads TPs are applied with respective voltages from the connection pads CPs through the plurality of connection lines CLs, respectively, and respective capacitances are formed in the touch pads TPs. When the touch area TA of the substrate SUB is touched, the capacitance of the touched position is changed, and thus, a voltage applied to the touch pad TP corresponding to the touched position is changed, and the touch panel 1000 may detect the position of the touched location.

In the touch panel 1000 according to the exemplary embodiment, each of the plurality of touch pads TPs disposed in the touch area TA of the substrate SUB are to the respective connection pads CPs through the respective connection lines CLs and each of the connection lines CLs include the first sub lines SL1s disposed in the touch area TA and the second sub lines SL2s disposed in the non-touch area NTA. Thus, the length of the first sub line SL1 and the length of the second sub line SL2, respectively, may be controlled if necessary, reducing or minimizing the entire area of the second sub lines SL2s disposed in the non-touch area NTA of the substrate SUB. That is, an entire area of the plurality of second sub lines SL2s disposed in the non-touch area NTA may be reduced or minimized, and thus, the entire area of the non-touch area NTA may be reduced or minimized, and the non-touch area NTA of the touch panel 1000 may have reduced size in two-dimension.

Further, in the touch panel 1000 according to an exemplary embodiment, the second sub line SL2 of the connection line CL connected to one touch pad TP disposed adjacent to the pad area CPA may have shorter length than the second sub lines SL2s of the connection lines CLs connected to other touch pads TPs disposed farther away from the pad area CPA than the one touch pads TPs, so the second sub line SL2 of the connection line CL connected to the touch pad TP far from the pad area CPA may be longer than the first sub line SL1. Since the second sub line SL2 may be formed of material having lower electrical resistance than that of the first sub line SL1, a delay of the voltage signal applied to the touch pads TPs that are disposed farther away from the connection pads CPs from the respective connection pads CPs through the respective connection lines CLs may be reduced or minimized. That is, even when the touch panel 1000 has a large touch area, the touch panel 1000 may have reduced or suppressed deterioration in the touch recognition sensitivity.

Hereinafter, a touch panel according to an exemplary embodiment will be described with reference to FIG. 3. Hereinafter, components different from those of the touch panel 1000 according to the exemplary embodiment described above will be described.

Figure 3:
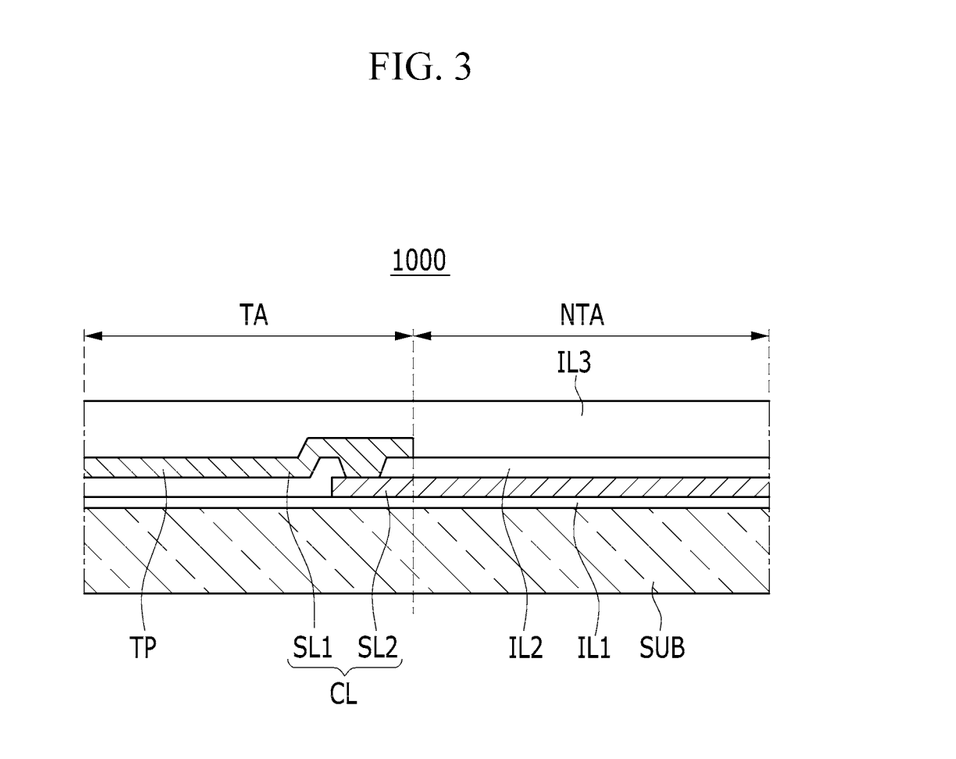
FIG. 3 is a cross-sectional view illustrating a portion of a touch panel according to an exemplary embodiment.

FIG. 3 is a cross-sectional view illustrating a portion of a touch panel according to an exemplary embodiment.

Referring to FIG. 3, the second sub line SL2 of the connection line CL is disposed on a different layer from the touch pad TP and the first sub line SL1, on the substrate SUB, and therefore, the first sub line SL1 may be disposed on the second sub line SL2 at a portion where the second sub line SL2 and the first sub line SL1 are connected to each other. The first insulating layer IL1 is disposed between the second sub line SL2 and the substrate SUB, the second insulating layer IL2 is disposed between the second sub line SL2 and the first sub line SL1, and the third insulating layer IL3 is disposed on the first sub line SL1, but the exemplary embodiments are not limited thereto. The second insulating layer IL2 is disposed between the second sub line SL2 and the first sub line SL1, and thus, the first sub line SL1 is connected to the second sub line SL2 through the contact hole formed in the second insulating layer IL2.

In the touch panel 1000 according to the exemplary embodiment, each of the touch pads TPs disposed in the touch area TA of the substrate SUB are respectively connected to the plurality of connection pads CPs through the respective connection lines CLs, which include the first sub lines SL1s disposed in the touch area TA and the second sub lines SL2s disposed in the non-touch area NTA, and thus the respective lengths of the first sub line SL1 and the length of the second sub line SL2 may be controlled to reduce or minimize the entire area of the second sub lines SL2s disposed in the non-touch area NTA of the substrate SUB. That is, an entire area of the second sub lines SL2s disposed in the non-touch area NTA may be reduced or minimized, and thus, the entire area of the non-touch area NTA may be reduced or minimized, and the none-touch area NTA of the touch panel 1000 may have reduced size in two-dimension.

Hereinafter, a display device 2000 according to an exemplary embodiment will be described with reference to FIGS. 4 and 5.

Hereinafter, although the exemplary embodiments illustrates an organic light emitting diode display including an organic light emitting diode as an example of a display device, the display device 2000 according to the exemplary embodiments is not limited thereto, and the display device 2000 may be various display devices such as liquid crystal displays (LCDs), plasma displays (PDs), field emission displays (FEDs), electrophoretic displays, (EPDs), electrowetting displays, (EWDs), and the like.

Figure 4:
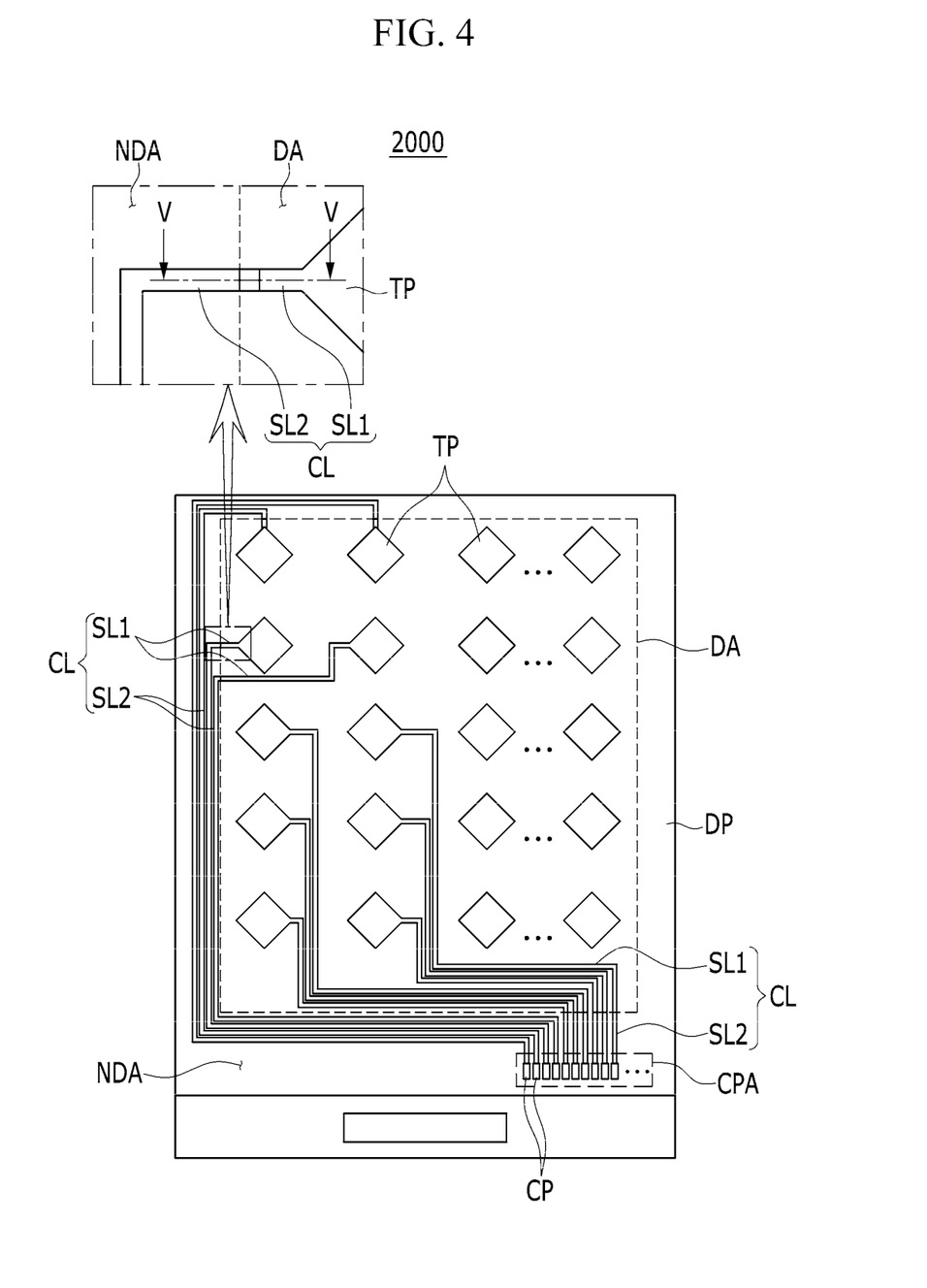
FIG. 4 is a plan view illustrating a display device according to an exemplary embodiment.

FIG. 4 is a plan view illustrating a display device 2000 according to an exemplary embodiment. FIG. 5 is a cross-sectional view taken along the section line V-V of FIG. 4.

Figure 5:
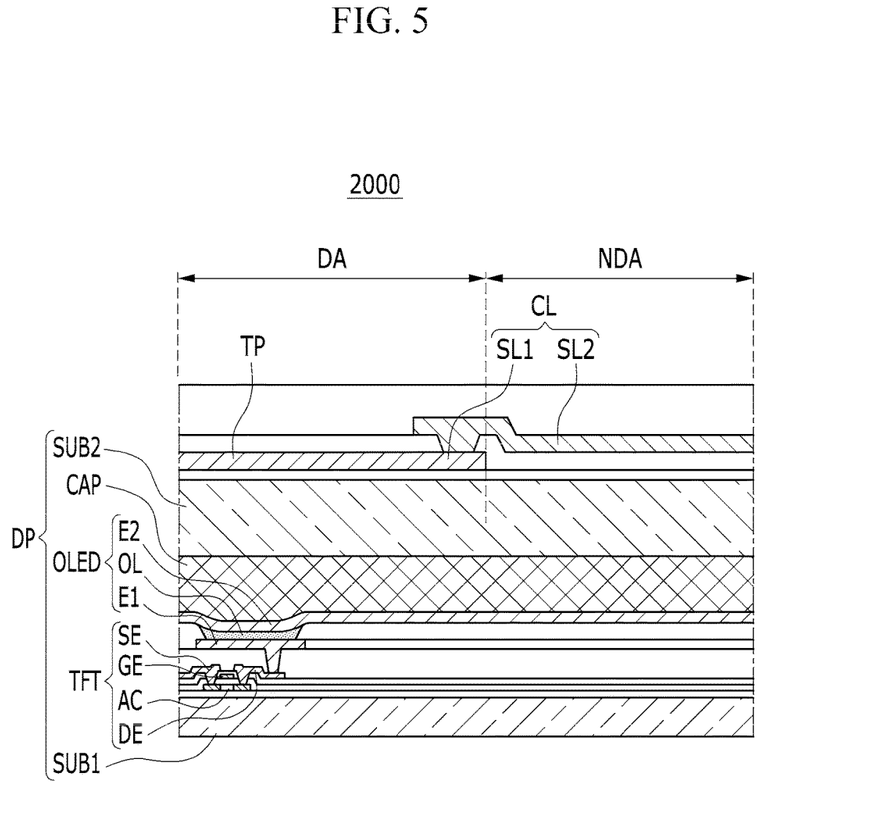
FIG. 5 is a cross-sectional view taken along the section line V-V of FIG. 4.

As illustrated in FIGS. 4 and 5, a display device 2000 configured to recognize a touch and simultaneously display an image according to an exemplary embodiment may include a display panel DP, the touch pad TP, the connection pad CP, and the connection line CL. The display device 2000 may include a touch controller (not illustrated), which may be in a form of the flexible printed circuit board (FPCB), the printed circuit board (PCB), and the like, and may be connected to the connection pad CP. The touch controller digitizes an electrical analog signal transmitted from the display device 2000 into a digital signal using a converter, and the like, to detect location information of a user's touch.

The display panel DP may include a first substrate SUB1 and a second substrate SUB2. The display panel DP may be flexible and may be a substrate including an organic material, an inorganic material, glass, or metals like stainless steel. The first substrate SUB1 and the second substrate SUB2 may be flexible, but is not limited thereto, and therefore the first substrate SUB1 and the second substrate SUB2 may be stretchable, foldable, bendable, or rollable. The display panel DP may be flexible, stretchable, foldable, bendable, or rollable, and therefore, the entire display device 2000 may be flexible, stretchable, foldable, bendable, or rollable.

The display panel DP includes a display area DA displaying an image, a non-display area NDA disposed adjacent to the display area DA, and a pad area CPA disposed within the non-display area NDA.

The display area DA of the display panel DP is disposed at a central portion in the whole plate surface of the display panel DP, but the exemplary embodiments are not limited thereto, and therefore, the display area DA may be disposed at a peripheral portion of the whole plate surface of the display panel DP.

The non-display area NDA is disposed surrounding the display area DA, but the exemplary embodiments are not limited thereto, and the non-display area NDA may be disposed adjacent to the display area DA.

The pad area CPA is disposed at a portion of the non-display area NDA, but the exemplary embodiments are not limited thereto, and therefore, the pad area CPA may be disposed at the whole portion of the non-display area NDA.

The display panel DP includes a first substrate SUB1, a thin film transistor TFT, an organic light emitting diode OLED, a capping layer CAP, and a second substrate SUB2.

A first substrate SUB1 may include at least one of glass, polymer, stainless steel, and the like. The first substrate SUB1 may be flexible, strechable, foldable, bendable, or rollable. The first substrate SUB1 is flexible, stretchable, foldable, bendable, or rollable, so the whole display panel DP may be flexible, stretchable, foldable, bendable, or rollable. For example, the first substrate SUB1 may be a flexible film including a resin such as polyimide, or the like.

The thin film transistor TFT may be connected to at least one scan wiring (not shown), at least one data wire (not shown), at least one thin film transistor (not shown), and at least one capacitor (not shown), all of which may have known various structures.

The thin film transistor TFT includes an active layer AC, a gate electrode GE, a source electrode SE, and a drain electrode DE.

The active layer AC may be formed of at least one of polysilicon, amorphous silicon, and an oxide semiconductor. The oxide semiconductor may include at least one of an oxide including titanium (Ti), hafnium (Hf), zirconium (Zr), aluminum (Al), tantalum (Ta), germanium (Ge), zinc (Zn), gallium (Ga), tin (Sn), and indium (In), and/or at least one of a composite oxide including a zinc oxide (ZnO), an indium-gallium-zinc oxide (InGaZnO$_4$), an indium-zinc oxide (Zn—In—O), a zinc-tin oxide (Zn—Sn—O), an indium-gallium oxide (In—Ga—O), an indium-tin oxide (In—Sn—O), an indium-zirconium oxide (In—Zr—O), an indium-zirconium-zinc oxide (In—Zr—Zn—O), an indium-zirconium-tin oxide (In—Zr—Sn—O), an indium-zirconium-gallium oxide (In—Zr—Ga—O), an indium-aluminum oxide (In—Al—O), an indium-zinc-aluminum oxide (In—Zn—Al—O), an indium-tin-aluminum oxide (In—Sn—Al—O), an indium-aluminum-gallium oxide (In—Al—Ga—O), an indium-tantalum oxide (In—Ta—O), an indium-tantalum-zinc oxide (In—Ta—Zn—O), an indium-tantalum-tin oxide (In—Ta—Sn—O), an indium-tantalum-gallium oxide (In—Ta—Ga—O), an indium-germanium oxide (In—Ge—O), an indium-germanium-zinc oxide (In—Ge—Zn—O), an indium-germanium-tin oxide (In—Ge—Sn—O), an indium-germanium-gallium oxide (In—Ge—Ga—O), a titanium-indium-zinc oxide (Ti—In—Zn—O), and a hafnium-indium-zinc oxide (Hf—In—Zn—O).

The active layer AC includes a channel region that is not doped with impurities, and a source region and a drain region that are doped with impurities, wherein the source region and the drain region are disposed at respective sides of the channel region. Different impurities may be used depending on a kind of thin film transistor, including an N-type and P-type impurities. When the active layer AC is formed of the oxide semiconductor, a separate protecting layer may be disposed to protect the oxide semiconductor which may be vulnerable to an external environment such as exposure to a high temperature, or the like.

The gate electrode GE is disposed on the active layer AC with one insulating layer interposed therebetween, and the source electrode SE and the drain electrode DE are disposed on another insulating layer covering the gate electrode GE. The source electrode SE and the drain electrode DE are respectively connected to the source region and the drain region of the active layer AC through respective contact holes. The drain electrode DE is connected to a first electrode E1 of the organic light emitting diode OLED through a contact hole.

The organic light emitting diode OLED includes the first electrode E1 connected to the drain electrode DE of the thin film transistor TFT, an organic emission layer OL disposed on the first electrode E1, and a second electrode E2 disposed on the organic emission layer OL.

The first electrode E1 may be an anode, which is a hole injection electrode, and may be a light reflective electrode, a light transflective electrode, and a light transmitting electrode. According to the exemplary embodiments, the first electrode E1 may also be a cathode, which is an electron injection electrode.

The organic emission layer OL is disposed on the first electrode E1. The organic emission layer OL may be formed of a low molecular organic material or a high molecular organic material such as poly 3,4-ethylenedioxythiophene (PEDOT), or the like. The organic emission layer OL may include a red organic emission layer configured to emit red light, a green organic emission layer configured to emit green light, and a blue organic emission layer configured to emit blue light, the red organic emission layer, the green organic emission layer, and the blue organic emission layer are respectively included in a red pixel, a green pixel, and a blue pixel to implement a color image. According to the exemplary embodiments, the organic emission layer OL may implement the color image by stacking the red organic emission layer, the green organic emission layer, and the blue organic emission layer in all of the pixels, and respectively including a red color filter, a green color filter, and a blue color filter in the red pixel, the green pixel, and the blue pixel. A white organic emission layer configured to emit white light may be formed in the organic emission layer OL in all of the pixels, and a red color filter, a green color filter, and a blue color filter may be disposed in each of the red pixel, the green pixel, and the blue pixel, generating the color image. When implementing the color image using the white organic emission layer disposed in the organic emission layer OL and the color filter, deposition masks for depositing the red organic emission layer, the green organic emission layer, and the blue organic emission layer on the respective red, green and blue pixels may be omitted. According to the exemplary embodiment, the white organic emission layer included in the organic emission layer OL may be formed of one organic emission layer or may include a plurality of organic emission layers stacked to emit white light. For example, the organic emission layer OL may include at least one yellow organic emission layer and at least one blue organic emission layer stacked together, at least one cyan organic emission layer and at least one red organic emission layer stacked together, and at least one magenta organic emission layer and at least one green organic emission layer stacked together to emit white light.

The second electrode E2 may be disposed on the organic emission layer OL and may be a cathode, which is an electron injection electrode. The second electrode E2 may be one of a light reflective electrode, a light transflective electrode, and a light transmitting electrode. The second electrode E2 is disposed over the entirety of the display area DA of the substrate SUB covering the organic emission layer OL. According to an exemplary embodiment, the second electrode E2 may be an anode, which is a hole injection electrode.

The capping layer CAP is disposed between a second substrate SUB2 and the organic light emitting diode OLED and protects the organic light emitting diode OLED. The capping layer CAP may also be omitted.

The second substrate SUB2 is disposed on the organic light emitting diode OLED and may include at least one of glass, polymer, stainless steel, and the like. The second substrate SUB2 may be flexible, strechable, foldable, bendable, or rollable, and therefore, the whole display panel DP may be flexible, stretchable, foldable, bendable, or rollable.

The second substrate SUB2 may be a thin film encapsulation. In this case, the thin film encapsulation may include an organic layer and an inorganic layer disposed on the organic layer. In detail, the thin film encapsulation may include at least one organic layer and at least one inorganic layer that are alternately stacked. More specifically, each of inorganic layers and organic layers may include multiple layers, and the inorganic layers and the organic layers may be alternately stacked. For example, the thin film encapsulation may include a sandwich structure in which at least one organic layer is inserted between at least two inorganic layers.

The touch pad TP, the connection pad CP, and the connection line CL are each disposed on the second substrate SUB2 of the display panel DP. The touch pad TP, the connection pad CP, and the connection line CL each may be directly formed on the second substrate SUB2 of the display panel DP, or may be attached on the second substrate SUB2.

The touch pad TP may include at least two touch pads TPs, and each of the touch pads TPs are disposed spaced apart from each other in the display area DA of the display panel DP. The touch pads TPs may be disposed in a regular matrix form in the display area DA of the display panel DP, but the exemplary embodiments are not limited thereto, and therefore, the touch pads TPs may be disposed in an irregular matrix form in the display area DA of the display panel DP. The touch pads TPs are disposed on the same layer on the display panel DP, and may be formed from a single plate using a photolithography process such as an MEMS process.

The touch pad TP has a two-dimensional rhombus shape, but the exemplary embodiments are not limited thereto, and therefore, the touch pad TP may have a triangle, a quadrangle, a pentagon, a hexagon, a heptagon, an octagon, a circle, and an oval shapes.

The touch pad TP may include transparent conductive materials such as silver nano wire (AgNW), indium tin oxide (ITO), and indium zinc oxide (IZO).

The connection pad CP may include at least two of connection pads CPs, each of the connection pads CPs disposed in the non-display area NDA of the display panel DP. In detail, each of the connection pads CPs may be disposed in the pad area CPA disposed within the non-display area NDA adjacent to the display area DA of the display panel DP, and each of the connection pads CPs may be disposed spaced apart from each other within the pad area CPA. The connection pad CP may be connected with the touch controller (not illustrated) formed in a form of a flexible printed circuit board (FPCB), a printed circuit board (PCB), or the like.

The connection line CL may include at least two connection lines CLs, each of the connection lines CLs connect between one of the touch pads TPs and one of the connection pads CPs, respectively. The connection line CL includes the first sub line SL1 and the second sub line SL2.

The first sub line SL1 of the connection line CL is disposed in the display area DA of the display panel DP and is directly connected to the touch pad TP. The first sub line SL1 includes the same material as the touch pad TP, and is integrally formed with the touch pad TP. The first sub line SL1 may include transparent conductive materials such as silver nano wire (AgNW), indium tin oxide (ITO), and indium zinc oxide (IZO).

The second sub line SL2 of the connection line CL is disposed in the non-display area NDA of the display panel DP, and connects the connection pad CP and the first sub line SL1. The second sub line SL2 includes the same material as the connection pad CP, and may be integrally formed with the connection pad CP. However, the exemplary embodiments are not limited thereto, and therefore, the second sub line SL2 may include a material different from the connection pad CP. The second sub line SL2 includes a material different from the touch pad TP and the first sub line SL1, respectively. The second sub line SL2 may include metal such as copper (Cu), molybdenum (Mo), silver (Ag), gold (Au), and aluminum (Al). The second sub line SL2 may include the opaque conductive material. The first sub line SL1 is disposed in the display area DA and thus includes the transparent conductive material, while the second sub line SL2 is disposed in the non-display area NDA and thus may include the opaque conductive material. That is, the second sub line SL2 includes a material having low electrical resistance regardless of a transparency of the respective material. Therefore, the second sub line SL2 may have electrical resistance lower than that of the first sub line SL1.

The second sub line SL2 may be disposed on a different layers from the touch pad TP and the first sub line SL1, on the display panel DP, and therefore, the second sub line SL2 may be disposed on the first sub line SL1 at a portion where the second sub line SL2 and the first sub line SL1 are connected to each other. Referring to FIG. 2, a first insulating layer IL1 is disposed between the first sub line SL1 and the display panel DP, a second insulating layer IL2 is disposed between the first sub line SL1 and the second sub line SL2, and a third insulating layer IL3 is disposed on the second sub line SL2, but the exemplary embodiments are not limited thereto. The second insulating layer IL2 is disposed between the first sub line SL1 and the second sub line SL2, and thus, the second sub line SL2 is connected to the first sub line SL1 through the contact hole formed in the second insulating layer IL2.

The second sub line SL2 of the connection line CL connected to one touch pad TP disposed adjacent to the pad area CPA may have shorter length than of the second sub lines SL2s of the connection lines CLs connected to other touch pads TPs disposed farther away from the pad area CPA than the one touch pads TPs. Furthermore, the second sub line SL2 of the connection line CL connected to the one touch pad TP extends straight, and the second sub lines SL2s of the connection lines CLs connected to other touch pads TPs extend bent at least once.

In the display device 2000 according to the exemplary embodiment, the touch pads TPs are applied with respective voltages from the connection pads CPs through the respective plurality of connection lines CLs and respective capacitances are formed in the touch pads TPs. When the display area DA of the display panel DP is touched, the capacitance of the touched position is changed, and thus, a voltage applied to the touch pad TP corresponding to the touch position is changed, and the display device 2000 may detect the position of the touched location.

In the display device 2000 according to an exemplary embodiment, each of the plurality of touch pads TPs disposed in the display area DA of the display panel DP are to the respective connection pads CPs, through the respective connection lines CLs and each of the connection lines CLs include the first sub lines SL1s disposed in the display area DA and the second sub lines SL2s disposed in the non-display area NDA. Thus, the length of the first sub line SL1 and the length of the second sub line SL2, respectively, may be controlled if necessary, reducing or minimizing the entire area of the second sub lines SL2s disposed in the non-display area NDA of the display panel DP. That is, the entire area of the plurality of second sub lines SL2s disposed in the non-display area NDA may be reduced or minimized, and thus, the entire area of the non-display area NDA may be reduced or minimized, and the non-display area NDA of the display device 2000 may have reduced size in two-dimension.

Further, in the display device 2000 according to another exemplary embodiment, the second sub line SL2 of the connection line CL connected to one touch pad TP disposed adjacent to the pad area CPA may have shorter length than the second sub lines SL2s of the connection lines CLs connected to other touch pads TPs disposed farther away from the pad area CPA than the one touch pads TPs, so the second sub line SL2 of the connection line CL connected to the touch pad TP far from the pad area CPA may be longer than the first sub line SL1. Since the second sub line SL2 may be formed of material having lower electrical resistance than that of the first sub line SL1, a delay of the voltage signal applied to the touch pads TPs that are disposed farther away from the connection pads CPs from the respective connection pads CPs through the respective connection lines CLs may be reduced or minimized. That is, even when the display device 2000 has a large display area, the display device 2000 may have reduced or suppressed deterioration in the touch recognition sensitivity.

According to an exemplary embodiment of the present invention, it is possible to provide the touch panel and the display device capable of suppressing the signal delay even though the plurality of touch pads are formed on the same layer.

Although certain exemplary embodiments and implementations have been described herein, other embodiments and modifications will be apparent from this description. Accordingly, the inventive concept is not limited to such embodiments, but rather to the broader scope of the presented claims and various obvious modifications and equivalent arrangements.

What is claimed is:

1. A touch panel, comprising:
   a substrate comprising a touch area and a non-touch area, the non-touch area disposed adjacent to the touch area;
   a touch pad disposed in the touch area;
   a connection pad disposed in the non-touch area; and
   a connection line comprising:
     a first sub line disposed in the touch area, the first sub line connected to the touch pad; and
     a second sub line which is disposed in the non-touch area, the second sub line connecting the connection pad and the first sub line,
   wherein:
   the touch pad comprises at least two touch pads, the connection pad comprises at least two connection pads, and the connection line comprises at least two connection lines,
   each of the touch pads are disposed spaced apart from each other in the touch area,
   each of the connection pads are disposed spaced apart from each other in a pad area, the pad area disposed in the non-touch area,
   each of the connection lines connect the respective touch pads and the respective connection pads, and wherein a length of one of the first sub lines of one connection line connected to one touch pad disposed adjacent to the pad area is longer than that of other first sub lines of other connection lines connected to other touch pads disposed farther away from the pad area than the one touch pad of the plurality of touch pads, and wherein the first sub line and the second sub line are directly connected to each other and the first sub line and the second sub line are disposed on different layers.

2. The touch panel of claim 1, wherein:
the first sub line comprises the same material as the touch pad.

3. The touch panel of claim 2, wherein:
the first sub line and the touch pad comprises a transparent conductive material.

4. The touch panel of claim 2, wherein:
the second sub line comprises a material different from the touch pad.

5. The touch panel of claim 4, wherein:
the second sub line comprises an opaque conductive material.

6. The touch panel of claim 4, wherein:
the second sub line has electrical resistance lower than that of the first sub line.

7. The touch panel of claim 4, wherein:
the second sub line and the touch pad are disposed on different layers each disposed on the substrate.

8. The touch panel of claim 7, wherein:
the second sub line is disposed on the first sub line.

9. The touch panel of claim 7, wherein:
the first sub line is disposed on the second sub line.

10. The touch panel of claim 1, wherein:
a length of one of the second sub line of one connection line connected to one touch pad disposed adjacent to the pad area is shorter than that of other second sub lines of other connection lines connected to other touch pads disposed farther away from the pad area than the one of the plurality of touch pads.

11. The touch panel of claim 10, wherein:
the second sub line of the connection line connected to the one touch pad extends in a straight line, and
the second sub lines of the connection lines connected to other touch pads comprise at least one bend.

12. A display device, comprising:
a display panel comprising: a display area displaying an image; and a non-display area adjacent to the display area;
a touch pad disposed on the display area;
a connection pad disposed on the non-display area; and
a connection line comprising:
 a first sub line disposed on the display area, the first sub line connected to the touch pad; and
 a second sub line disposed on the non-display area, the second sub line connecting the connection pad and the first sub line,
wherein:
the touch pad comprises at least two touch pads, the connection pad comprises at least two connection pads, and the connection line comprises at least two connection lines,
each of the touch pads are disposed spaced apart from each other in the touch area,
each of the connection pads are disposed spaced apart from each other in a pad area, the pad area disposed in the non-touch area, and
each of the connection lines connect the respective touch pads and the respective connection pads,
wherein a length of one of the first sub lines of one connection line connected to one touch pad disposed adjacent to the pad area is longer than that of other first sub lines of other connection lines connected to other touch pads disposed farther away from the pad area than the one touch pad of the plurality of touch pads, and
wherein the first sub line and the second sub line are directly connected to each other and the first sub line and the second sub line are disposed on different layers.

13. The display device of claim 12, wherein:
the first sub line comprises the same material as the touch pad.

14. The display device of claim 13, wherein:
the second sub line comprises a material different from the touch pad.

15. The display device of claim 14, wherein:
the second sub line has electrical resistance lower than that of the first sub line.

16. The display device of claim 12, wherein:
a length of one of the second sub line of one of the connection line connected to one touch pad disposed adjacent to the pad area is shorter than that of other second sub lines of other connection lines connected to other touch pads disposed farther away from the pad area than the one of the plurality of touch pads.

17. The display device of claim 16, wherein:
the second sub line of the connection line connected to the one touch pad extends in a straight line, and
the second sub lines of the connection lines connected to other touch pads comprise at least one bend.

18. The display device of claim 12, wherein the first sub line and the second sub line overlaps each other at a portion where the second sub line directly connects the first sub line, and the portion is disposed in the touch area.

19. The display device of claim 12, wherein the first sub line is integral with the touch pad, the second sub line directly connects the first sub line, and
wherein the second sub line comprises a plurality of groups of second sub lines, and the plurality of groups of second sub lines comprise:
a first group of the plurality of second sub lines curved at least once and extended in the non-touch area; and
a second group of plurality of second sub lines extending in a straight line in the non-touch area.

20. A touch panel, comprising:
a substrate comprising a touch area and a non-touch area;
a touch pad disposed in the touch area; and
a connection line connected to the touch pad,
wherein the connection line comprises:
a first sub line disposed in the touch area and connected to the touch pad; and
a second sub line disposed in the non-touch area and connected to the first sub line,
wherein the touch panel comprises a plurality of first sub lines, and
a length of one of the plurality of first sub lines is different from the other plurality of first sub lines, and
wherein the first sub line and the second sub line are directly connected to each other and the first sub line and the second sub line are disposed on different layers.

21. The touch panel of claim 20, wherein:
the second sub line comprises a material different from the first sub line.

22. The touch panel of claim 20, wherein:
the second sub line has an electrical resistance lower than that of the first sub line.

23. The touch panel of claim 20, wherein the first subline extends in the direction that minimizes the distance to the non-touch area.

\* \* \* \* \*